United States Patent [19]

Petcavich

[11] Patent Number: 5,505,830
[45] Date of Patent: Apr. 9, 1996

[54] BIODEGRADABLE COMPOSTABLE PLASTIC AND METHOD OF MAKING THE SAME

[75] Inventor: Robert J. Petcavich, San Diego, Calif.

[73] Assignee: Planet Polymer Technologies, Inc., San Diego, Calif.

[21] Appl. No.: 379,269

[22] Filed: Jan. 27, 1995

Related U.S. Application Data

[63] Continuation-in-part of Ser. No. 104,198, Aug. 10, 1993, abandoned.

[51] Int. Cl.⁶ ............................................. C08B 3/22
[52] U.S. Cl. .................. 204/157.63; 204/157.65; 204/157.68; 536/76; 524/39
[58] Field of Search .................. 536/63, 65, 69, 536/76; 524/37, 38, 39; 204/157.63, 157.65, 157.68

[56] References Cited

U.S. PATENT DOCUMENTS

| | | |
|---|---|---|
| 3,901,838 | 8/1975 | Clendinning et al. |
| 3,921,333 | 11/1975 | Clendinning et al. ............... 47/37 |
| 4,016,117 | 4/1977 | Griffin . |
| 4,021,388 | 5/1977 | Griffin . |
| 4,125,495 | 11/1978 | Griffin . |
| 4,218,350 | 8/1980 | Griffin . |
| 4,420,576 | 12/1983 | Griffin ............................ 524/47 |
| 4,420,611 | 12/1983 | Scheve ............................ 536/88 |
| 4,826,493 | 5/1989 | Martini et al. ................... 604/327 |
| 5,009,648 | 4/1991 | Aronoff et al. .................. 604/332 |
| 5,171,309 | 12/1992 | Gallagher et al. ............... 604/365 |
| 5,178,469 | 1/1993 | Collinson ........................ 383/1 |

OTHER PUBLICATIONS

Eastman Chemical Company, Kingsport, Tennessee, "Tenite Cellulosic Plastics", Oct., 1991.
E–BEAM Services, Inc., Plainview, New York, "Your Partner in Electron Beam Processing", Sep., 1992.

*Primary Examiner*—Jeffrey Mullis
*Attorney, Agent, or Firm*—Juettner Pyle Lloyd & Piontek

[57] ABSTRACT

Electron beam radiation of resin blends and compounds comprises in major part by weight of cellulose acetate accelerates the rate and increases the degree of biodegradation of the compounds and products made therefrom, and renders the same fully compostable, without sacrifice of physical properties.

6 Claims, 1 Drawing Sheet

BIODEGRADABLE COMPOSTABLE PLASTIC AND METHOD OF MAKING THE SAME

This application is a continuation-in-part of application Ser. No. 08/104,198 filed Aug. 10 1993, now abandoned.

FIELD OF THE INVENTION

The present invention relates to the production of disposable plastic articles of manufacture that are biodegradable and compostable in solid waste, such as municipal landfills and the like, and particularly to resins for the manufacture of such articles and methods of making the same.

BACKGROUND OF THE INVENTION

Investigations into and efforts to develop plastics within the field of the invention have been extensive.

For example, the inventor herein named has developed resin blends for making plastic articles that are hydrodegradable, i.e., water dispersible, based on the use of polyethyleneoxide ("PEO") in combination with certain functionally compatible polymers. The inventor has also developed biodegradable resin blends based on the use of polycaprolactone ("PCL") in combination with functionally compatible polymers. Investigations continue for additional plastic resins that will process in conventional manners and cycle times and that will produce products that are biodegradable and compostable in municipal waste.

The compostability of plastics and other materials is determined by judging the same in comparison with microcrystalline cellulose under controlled composting conditions in accordance with ASTM Standard D. 5338-92. It is widely known that nature handles cellulose well. Consequently, and because the standard of comparison is microcrystalline cellulose, investigations have been conducted in respect of various cellulose compounds, e.g., hydroxypropylcellulose.

One group of cellulose compounds that has not been seriously investigated is the group of compounds and resin blends comprised in major part of cellulose acetate, presumably because cellulose acetate is generally known to be essentially nondegradable.

SUMMARY OF THE INVENTION

The present invention resides in the discovery that the biodegradability of cellulose acetate resin blends can be significantly increased by electron beam (E-Beam) radiation.

The theory underlying the discovery is as follows: The acetate side group in cellulose acetate is too large for enzymes to penetrate and the plastic product therefore is essentially nondegradable. If enough of the acetate side group could be sliced off, it is possible the structure could be sufficiently modified to permit penetration by enzymes. It is potentially possible that radiation could attack the ether linkages, break the bonds and modify the acetate structure sufficiently to permit enzyme penetration and thus biodegradation.

Whether this theory is or is not accurate, tests conducted have established that the postulate works. E-Beam radiation of cellulose acetate resin compounds, even at a low dosage level, has resulted in production of cellulose acetate products having substantially enhanced biodegradability and compostability. Moreover, the modification of the resin has not produced any change in the processability of the resin for the production of end products, and the end products have the appearance and physical characteristics of conventional cellulose acetate products, except that they are now biodegradable.

It is therefore an object of the invention to provide new biodegradable plastic end products, improved thermoformable resin blends for making such end products, and methods for making such resins and products.

These and other objects and advantages of the invention will become apparent to those of reasonable skill in the art from the following detailed description as considered in conjunction with the accompanying drawings.

DETAILED DESCRIPTION

Figure 1:
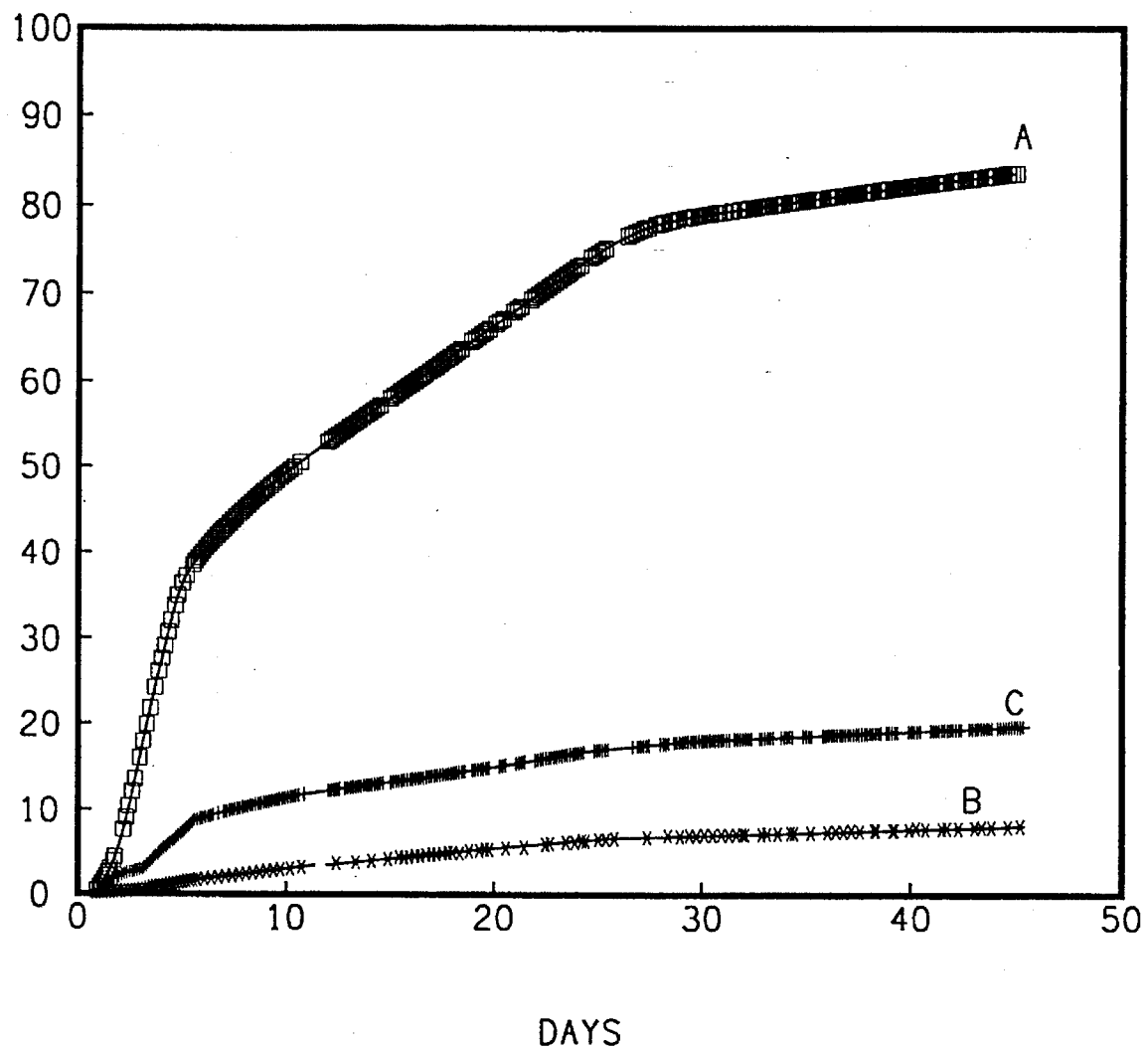
FIG. 1 is a graph comparatively depicting biodegradation characteristics wherein curve A indicates the biodegradation characteristics of microcrystalline cellulose, curve B indicates the biodegradation characteristics of conventional cellulose acetate resin pellets, and curve C indicates the biodegradation characteristics of the same cellulose acetate resin pellets after the same have been modified in accordance with the invention and irradiated at a E-Beam dosage of 2 megarads.

The following is a detailed description of the best mode presently contemplated by the inventor of carrying out his invention. Modifications of and/or amplifications thereon may appear to those of reasonable skill in the art as the description proceeds.

Cellulose acetate resin compounds are available in a variety of formulations from Eastman Chemical Company, Kingsport, Tenn., under the trademark TENITE. Eastman's literature states that:

"TENITE cellulosic plastics are produced from cellulose, a renewable resource obtained from wood pulp or cotton linters.

"TENITE acetate is formed by reacting cellulose with acetic acid and acetic anhydride, with sulfuric acid normally used as the catalyst. The ester is subsequently compounded with plasticizers, heat stabilizers, pigments, and other additives to produce the specific formulations . . . .

"TENITE acetate . . . [is] manufactured in a variety of formulas and flows, in 3.2 mm (⅛ in.) pellets for molding and extrusion."

These cellulose acetate resin compounds or blends[1] are formed into end products by conventional thermoforming processes, such as injection molding, slot casting and extrusion into films, sheets, tubes and profiles. Depending on the formulation of the resin blend, the thermoformed end products may be transparent, translucent or opaque, and either clear or colored. Applications are very extensive and include, for example, tool handles, ophthalmic frames, face and eye shields, tooth brushes and hair brushes, personal care items, pipes and tubes, medical devices, automotive steering wheels and trim, store fixtures and displays, appliance parts, toys and sporting goods, writing instruments, sheeting and furniture profiles.

[1] As used herein, the terms "cellulose acetate compounds", "resin compounds", "resin blends" and "resin pellets" are essentially synonymous and refer to resin compounds or blends of the type above and here described, which are comprised in major part by weight of cellulose acetate.

Normally, products made from cellulose acetate are not compostable. Prior to processing into end products, resin blend pellets obtained from Eastman Chemical, containing various additives such as plasticizers, processing aids and other additives, in proportions up to about 40% by weight, exhibit a biodegradation factor in the order of about 7% over a 45 day standard composting test period. Extrapolation of the data indicates that little if any additional biodegradation of the resin pellets would occur over time. The modest degradation that does occur presumably is attributable to the additives. Products made from the resins are not biodegradable and are not compostable.

A compostable material is defined as follows:

"A material which undergoes physical, chemical, thermal and/or biological degradation in a municipal solid waste composting facility such that it enters into and is physically indistinguishable from the finished compost (humus), and which ultimately mineralizes (biodegrades to carbon dioxide, water and biomass) in the environment at a rate equivalent to that of known compostable materials in municipal solid waste such as paper and yard waste."

A biodegradable material is defined as a material that is "capable of being broken down into innocuous products by the action of living beings (i.e., microorganisms)." It is a material that degrades and mineralizes as a consequence of microbial enzymatic attack by microorganisms such as bacteria, fungus, algae and protozones. Biodegradation occurs anaerobically as well as aerobically. Ionization and/or oxidation is not required.

When testing for biodegradability and compostability for organic waste systems, test laboratories utilize standard procedures for obtaining test and research results on an expedited basis. In the research and test programs about to be discussed, the test medium employed is a dry activated sewage sludge, the base comparison material is microcrystalline cellulose, and the test period is 45 days. The tests are carried out in accordance with ASTM Standard D.5338-92.

Referring to FIG. 1, curve A indicates the biodegradation characteristic of microcrystalline cellulose for the particular comparative test. As indicated, and as is conventional in such tests, microcrystalline cellulose has a biodegradation factor of about 80% at about 35 days and then levels off with no further biodegradation. This is to be expected. Even though cellulose is known to be 100% biodegradable, 100% disappearance of the material cannot be expected since all solids will have a certain amount of residue, i.e., biomass, remaining, as is inherent in the definition of compostability. Cellulose is fully compostable.

Curve B in FIG. 1 indicates the biodegradation characteristic of a standard Eastman Chemical TENITE brand of cellulose acetate resin pellets obtainable under the designation A036. These resin pellets contain in the order of about 25% by weight of diethyl phthalate plasticizer and other processing aids. As indicated, the biodegradation at about 35 days is in the order of about 7% and thereafter remains essentially constant at this level indicating that little if any further biodegradation will occur. It is believed that such biodegradation as occurs in respect of the resin pellets is due to the presence of the plasticizer and other additives, inasmuch as the end products themselves are not biodegradable or compostable.

Curve C in FIG. 1 indicates the biodegradation characteristic of the same TENITE A036 cellulose acetate resin pellets following modification of the pellets in accordance with the present invention by passage of the same through an electron beam curtain to obtain a radiation exposure dosage of 2 megarads. As illustrated, the biodegradation characteristic is more than twice that of the untreated acetate pellets. Indeed, both the rate and the degree of degradation are significantly increased. Moreover, at the termination of the 45 day test period, biodegradation was continuing as is indicated by the continued upward inclination of curve C in contrast to the leveling off of curve B. Extrapolation of the data points results in a projection of 65% biodegradation over 180 days.

Manifestly, the electron beam radiation treatment drastically modified the structure of the resin compound. It is theorized that ether bonds were split or broken by the radiation treatment, resulting in a decrease in the acetate side group and a decrease in molecular weight, thereby permitting enzyme penetration and biodegradation of the compound. In any event, regardless of theory, the rate of biodegradation was nearly tripled by practice of the invention.

The biodegradation studies above described were conducted by O.W.S. Inc. of Dayton, Ohio and Gent, Belgium, an independent laboratory specializing in testing for biodegradability and compostability. The studies were conducted in accordance with recently adopted ASTM Standard D. 5338-92 and are closely monitored to determine inherent degradability in active compost by calculation of the conversion of carbon to carbon dioxide.

The controlled composting test is an optimized simulation of an intensive aerobic composting process where the degradability of a test substance under dry aerobic conditions is determined. The inoculum consists of stabilized and mature compost derived from the organic fraction of municipal solid waste. The test substances are mixed with the inoculum and introduced into static reactor vessels where they are intensively composted under controlled oxygen, temperature and moisture conditions.

During the aerobic degradation of organic materials, a mixture of gases, principally carbon dioxide and water, are the final decomposition products while part of the organic material will be assimilated for cell growth. The carbon dioxide production is continuously monitored and integrated to determine the carbon dioxide production rate and the cumulative carbon dioxide production.

After determining the carbon content of the test compound, the percentage of degradation can be calculated as the percentage of solid carbon of the test compound which has been converted to gaseous, mineral carbon (C) under the form of carbon dioxide ($CO_2$). Also the kinetics of the degradation can be established.

The test and reference substances are mixed with the inoculum in a ratio of roughly 1 to 1.5 parts of dry matter to 6 parts of dry matter and introduced into the reactors. The reactors are closed airtight and put into the incubators. The temperature of the reactors is continuously controlled and follows an evolution which is representative for a real composting temperature profile:

35° C. during day 0–1

58° C. during days 1–5

50° C. during days 5–28

35° C. during days 28–45

Pressurized dry air, free of $CO_2$ and with a standard composition is sent over a gas flow controller which regulates very precisely the flow rate and blown into the composting vessel at the bottom through a porous plate. Through biodegradation solid carbon of the test compound is converted and $CO_2$ is produced.

The gas leaving each individual reactor is continuously analyzed on regular intervals (every 3 hours) for $CO_2$ and $O_2$ concentration. Also the flow rate is measured regularly. Likewise the cumulative $CO_2$ production can be determined. The percentage of biodegradation is determined as the percentage of solid carbon of the test compound which is converted to gaseous, mineral C under the form of $CO_2$.

For purposes of comparison with the present invention, the following table sets forth the results of a study conducted by O.W.S. Inc. for the applicant to determine the biodegradability of various materials frequently introduced into landfills, most of which are assumed to be biodegradable.

According to their percentage of carbon conversion after 45 days, the test substances were classified for biodegradability under controlled composting conditions as follows:

| | |
|---|---|
| Cellulose: | 76.2% |
| Cellulose paper: | 66.9% (87.8%) |
| Kraft paper: | 62.2% (81.6%) |
| Cardboard: | 48.1% (63.1%) |
| Magazines: | 46.3% (60.8%) |
| Newspaper: | 34.3% (45.0%) |
| Polyethylene: | 0.4% (0.5%) |

Between the parentheses a percentage is given of the biodegradation of the test substance compared to the degradation of cellulose, which is known to be fully compostable.

The study stated, in conclusion, that polyethylene showed no biodegradation. Newspaper, cardboard and magazines showed a medium degradation, while cellulose paper and kraft paper showed a high biodegradation.

These studies establish that biodegradation in the order of 60–70% is very high. Considering the inherent biomass of completely degradable cellulose, materials which have a test degradation of 60 to 70% are in fact 80 to 90% biodegradable and thus fully compostable.

Therefore, the irradiated cellulose acetate compounds of the invention are qualified for identification as fully compostable plastics.

Cellulose can have a degree of substitution ranging from 0 to 3; zero substitution being cellophane and a substitution of 3 being a triacetate. The cellulose acetates of particular interest here are those having a degree of substitution of from about 1.5 to about 2.5.

To enhance the rate and the degree of biodegradation, the processing aids employed in the cellulose acetate resin blends or compounds of the invention are comprised of plasticizers which will enhance biodegradation, namely, those selected from the group comprised of propylene glycol, polyethylene glycol, glycerin and glycerol triacetate. These additives are employed in percentages of from about 15% to about 40% by weight of the resin blend. If used, the polyethylene glycol should have a low molecular weight, e.g., less than 20,000 and preferably in the order of about 5,000 weigth average molecular weight.

The electron beam irradiated cellulose acetate A036 resin pellets used as samples in the above described tests were E-Beam treated pursuant to the inventor's instructions by E-Beam Services, Inc. of Plainview, New York and Cranbury, N.J.

Electron beam radiation of cellulose acetate resin pellets is preferred because it is safe, clean, fast and economical, does not involve harmful rays, and does not require the use of radioactive materials.

The E-Beam radiation dosage may range from 0.5 to 10 megarads, but a dosage of at least 2 megarads and within a range of 2 to 5 megarads is preferred for purposes of efficiency, effectiveness and economy of treatment. Also, while the end products could themselves be irradiated, it will generally prove more cost effective and more reliable to treat the resin in the form of the uniform sized pellets produced by Eastman Chemical.

In a presently preferred practice, the resin pellets are distributed substantially uniformly onto a conveyor having a variable speed drive and a path of travel below the emitter window of an electron beam generator/accelerator. The conveyor speed and the energization level of the generator/accelerator are appropriately controlled to cause the resin pellets to pass through a high energy beam or curtain of electrons which penetrate the resin pellets and irradiate the same to a prescribed radiation dosage, e.g., 2 to 5 megarads. This is not merely a surface treatment. Penetration is essentially complete so that substantially the entire volume of the resin blend or compound is irradiated.

Such irradiation apparently decreases the molecular weight and increases the melt index of the treated compound. The untreated pellets produced by Eastman have a melt index in the order of about 3.5. When treated at a radiation dosage of 2 megarads, the pellets have a melt index of about 6.5 and are ideally suited for the formation of thin films, such for example as those used in blister packaging. When treated at a radiation dosage of about 3 megarads, the resin should have a melt index of about 7.5 and be ideally suited for the formation of sheets, particularly sheets about 15 mils thick which may be thermoformed into end products such as disposable plates, eating utensils and food containers, for example, clamshell containers for fast food restaurants. When treated at a radiation dosage of about 4 megarads the resin should have a melt index of about 8.5 and be ideally suited for the manufacture of injection molded products.

A test run of TENITE A036 resin pellets treated at an E-Beam radiation dosage of 3 megarads was conducted in accordance with ASTM sheeting standard "MI", test method A, using die No. D1238, having a die orifice of 0.0148 inches, a die length of 0.8 inches, a die width of 42 inches, and a die temperature of about 190° C. The resin processed perfectly, as good as any cellulose acetate previously run by the test facility, and produced a 15 mil thick 40 inch wide sheet that was water clear transparent, like glass, and of a quality as good as any other cellulose acetate. The sheet was subsequently thermoformed into clamshell containers. The sheet processed perfectly and produced excellent, glass-like, transparent containers.

For injection molded products, the radiation treated cellulose acetate resins of the invention process the same as untreated cellulose acetate resins and produce products of conventional characteristics, with the added advantage of compostability for products that are intended to be disposable. In particular, injection molding cycle times should be in the order of 15 seconds, as is conventional for cellulose acetate, in contrast to the 45–60 second cycle time required for other biodegradable resin blends.

The objects and advantages of the invention have therefore been shown to be attained in a convenient, practical and economical manner.

While certain preferred embodiments of the invention have been herein described, it is to be appreciated that various changes, rearrangements and modifications may be made therein without departing from the scope of the invention, as defined by the appended claims.

What is claimed is:

1. A process for enhancing the biodegradability of resin blends, and articles made from resin blends, that are comprised in major by weight of cellulose acetate, consisting essentially of the steps of forming a resin blend consisting essentially of cellulose acetate and glycerin triacetate and comprised in major part by weight of cellulose acetate having a degree of substitution within the range of from about 1.5 to about 2.5, and exposing said resin blend to a high energy electron source consisting essentially of electron beam radiation at a radiation dosage of at least about 2 megarads.

2. A process as set forth in claim 1 wherein the resin blend is irradiated at an electron beam radiation dosage of up to about 10 megarads.

3. A process as set forth in claim 1 wherein the resin blend is irradiated at an electron beam radiation dosage of from about 2 to about 5 megarads.

4. A resin blend comprised in major part by weight of cellulose acetate and treated to have, and for making disposable, biodegradable articles of manufacture that have, enhanced biodegradability, comprising a resin blend consisting essentially of cellulose acetate and glycerin triacetate and comprised in major part by weight of cellulose acetate having a degree of substitution within the range of from about 1.5 to about 2.5 and that has been exposed to a high energy electron source consisting essentially of electron beam radiation at a radiation dosage of at least about 2 megarads.

5. A resin blend as set forth in claim 4, including from about 15% to about 40% by weight of glycerin triacetate.

6. A process of making cellulose acetate articles of manufacture that have an enhanced rate of biodegradation, consisting essentially of the steps of forming a resin blend consisting essentially of cellulose acetate and glycerin triacetate and comprised in major part by weight of cellulose acetate having a degree of substitution within the range of from about 1.5 to about 2.5, exposing said resin blend to a high energy electron source consisting essentially of electron beam radiation at a radiation dosage of at least about 2 megarads, and thermoforming said resin blend into articles of manufacture.

* * * * *